United States Patent [19]

Grosbois et al.

[11]  4,405,591

[45]  Sep. 20, 1983

[54] HYDROGENATION OF CHLOROSILANES TO SILANE, SiH$_4$, IN BATH OF MOLTEN SALTS

[75] Inventors: Jean Grosbois, L'Isle Adam; Jean-Yves Dumousseau, Paris, both of France

[73] Assignee: Rhone-Poulenc Specialites Chimiques, Courbevoie, France

[21] Appl. No.: 358,853

[22] Filed: Mar. 17, 1982

[30] Foreign Application Priority Data

Apr. 17, 1981 [FR] France ................................ 81 07765

[51] Int. Cl.$^3$ ............................................ C01B 33/04
[52] U.S. Cl. .................................................... 423/347
[58] Field of Search ........................................ 423/347

[56] References Cited

U.S. PATENT DOCUMENTS 3,163,590  12/1964  Litz et al. ............................ 423/347
4,041,136   8/1977  Franklin et al. .................... 423/347

*Primary Examiner*—Jack Cooper
*Attorney, Agent, or Firm*—Burns, Doane, Swecker & Mathis

[57] ABSTRACT

Silane, a useful intermediate in the production of silicon, is facilely quantitatively prepared by hydrogenating chlorosilanes in a bath of molten salts, said molten bath comprising a ternary mixture of lithium chloride and two other metal chlorides, such two other metal chlorides being either two different alkaline earth metal chlorides, or one alkaline earth metal chloride and one alkali metal chloride, or two different alkali metal chlorides, and said ternary mixture having a melting point not in excess of about 400° C.

4 Claims, 1 Drawing Figure

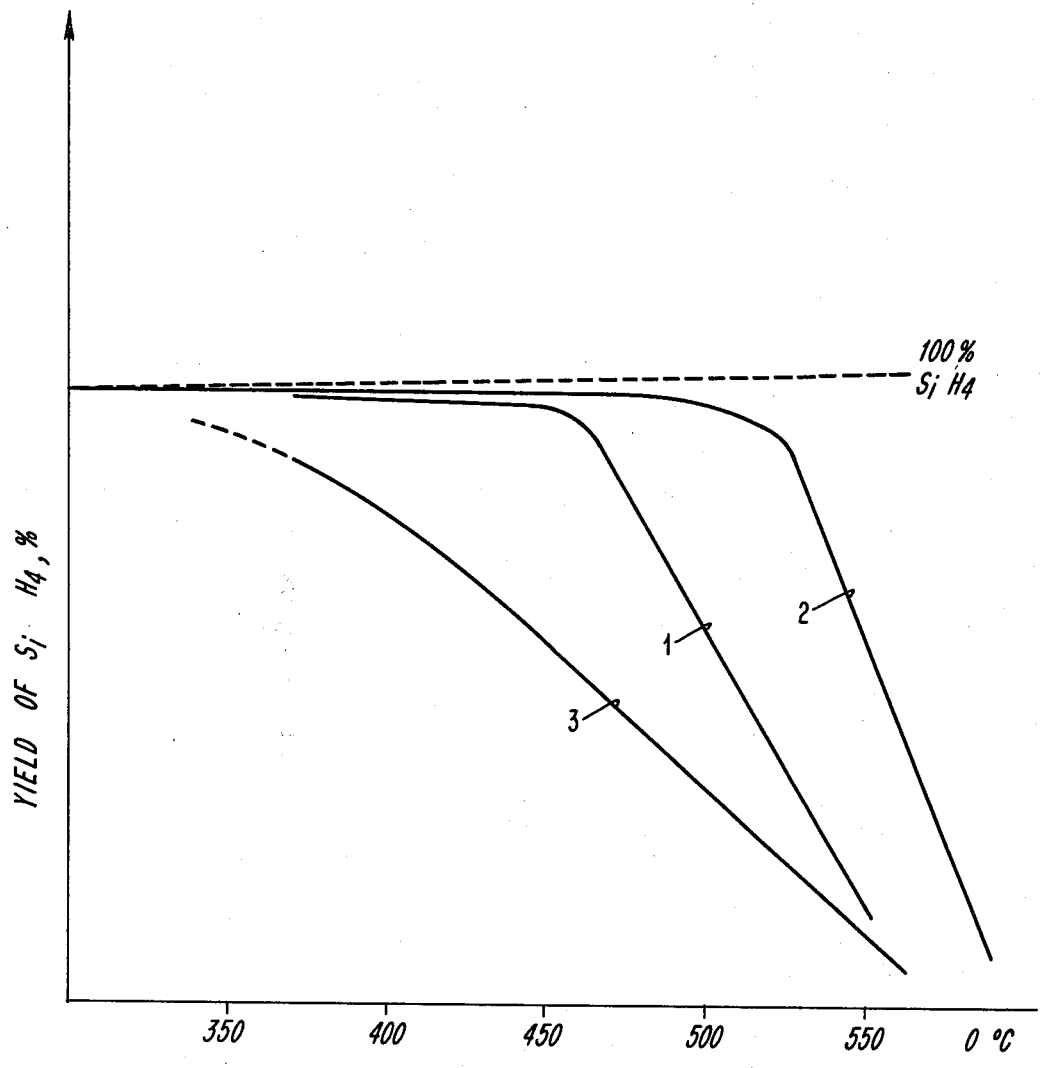

HYDROGENATION OF CHLOROSILANES TO SILANE, SiH$_4$, IN BATH OF MOLTEN SALTS

BACKGROUND OF THE INVENTION

1. Field of the Invention

The present invention relates to the preparation of silane, and, more especially, to the preparation of silane by the hydrogenation of chlorosilanes in a bath of molten salts.

2. Description of the Prior Art

The preparation of silane, SiH$_4$, by reacting chlorosilanes, SiH$_{4-x}$Cl$_x$, with lithium hydride is known to this art. This reaction can be carried out in a bath of molten salts, consisting, in particular, of a eutectic mixture of lithium chloride and potassium chloride, which melts at about 360° C. The reaction can be represented as follows:

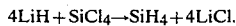

The silane (SiH$_4$) produced is gaseous and it is removed continuously. The lithium chloride thus formed enriches the bath, and such bath can be diverted to a zone of electrolysis zone into which hydrogen is introduced to re-form lithium hydride such that the aforesaid reaction scheme can continue to proceed.

Practically, however, the noted process has a significant disadvantage.

Indeed, the reaction of chlorosilanes with lithium hydride is highly exothermic, with the result that the silane formed partially decomposes in the bath of molten salts, according to the reaction:

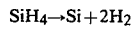

This reaction becomes substantial at about 400°–450° C.

Consequently, the yields of SiH$_4$ are never quantitative and range from 40 to 80% at most.

SUMMARY OF THE INVENTION

Accordingly, a major object of the present invention is the provision of an improved process for the preparation of silane by hydrogenation of chlorosilanes in a bath of molten salts, which process is characterized by marked reduction of the aforesaid competing silane cracking reaction and which enables the essentially quantitative production of silane.

Briefly, it has now surprisingly and unexpectedly been determined that the utilization of certain, specific baths of certain molten salts minimizes to a marked extent the aforenoted objectionable silane cracking reaction.

BRIEF DESCRIPTION OF THE DRAWING

The FIGURE of Drawing is a graph plotting the yields of silane (ordinate) as a function of the temperature of the bath of molten salts (abscissa), for three different baths.

DETAILED DESCRIPTION OF THE INVENTION

More particularly according to this invention, featured is the preparation of silane by hydrogenation of chlorosilanes in a bath of molten salts, with such bath necessarily comprising a ternary mixture of lithium chloride and two other chlorides of either two alkaline earth metals, or of one alkaline earth metal and one alkali metal, respectively, or of two alkali metals, and said ternary mixture having a melting point not in excess of about 400° C.

According to a preferred embodiment of the invention, potassium chloride and barium chloride are employed in the bath of salts as the "other" two chlorides referred to above.

According to another preferred embodiment of the invention, potassium chloride and calcium chloride are employed in the bath of salts as the other two chlorides referred to above.

The use of the ternary mixtures according to the invention as the baths of molten salts is notably advantageous because it appears that the cracking of the silane only takes place at a considerably higher temperature, on the order of about one hundred degrees higher, than that at which it takes place with the conventional binary mixture LiCl/KCl, namely, in this case, at about 400° C.–450° C. as above shown. It has therefore been found that the mixtures according to the invention dramatically increase the stability of SiH$_4$.

Moreover, the use of the baths of salts consistent with this invention results in a certain economic advantage because the lithium chloride, which is an expensive product, is used in smaller amounts than in the case of the conventional binary mixture, LiCl/KCl.

Other characteristics and advantages of the invention will become more apparent from the description which follows, in reference to the attached FIGURE of Drawing, in which:

the single graph FIGURE corresponds to three curves plotting the yield of SiH$_4$ (on the ordinate) as a function of the temperature $\theta$ (on the abscissa) of the mixture of molten salts, for three different baths.

The baths according to the invention necessarily all contain lithium chloride. The other constituents will be selected essentially according to the temperature which must be attained in order to maintain the mixture in molten state, in particular according to the eutectic point which this mixture can have. This temperature must not be above that at which the cracking of the silane is likely to take place, namely, must not be above about 400° C.

Furthermore, in practice, it is preferred to carry out the reaction at a temperature which is about 50° to 100° C. above the temperature required to maintain the mixture in the molten state, such as to provide a mixture of good fluidity and to improved the transfer of materials.

Thus, the mixtures which preferably are selected are those which, taking account of the operating condition mentioned above, have a melting point which is about 50° to 100° C. below the above-mentioned silane cracking temperature, i.e., a melting point of 300° C. to 350° C.

The following are particularly representative of suitable ternary mixtures within the scope of the invention, other than those already specified above: LiCl/KCl/NaCl; LiCl/KCl/RbCl; LiCl/KCl/SrCl$_2$; LiCl/KCl/MgCl$_2$; LiCl/BaCl$_2$/CaCl$_2$; LiCl/CsCl/SrCl$_2$.

The reaction is preferably carried out with eutectic mixtures or mixtures which are approximately eutectic. However, it can indeed be carried out with mixtures which vary further from the eutectic, insofar as the melting point of the bath remains below about 400° C.

In order to further illustrate the present invention and the advantages thereof, the following specific examples are given, it being understood that same are intended only as illustrative and in nowise limitative.

EXAMPLE 1

A gaseous mixture containing 6% of $SiCl_4$ in hydrogen was introduced into a stainless steel reactor containing the molten eutectic mixture $CaCl_2/KCl/LiCl$ (8/42/50 mol %) melting at about 335° C., to which lithium hydride had been added (about 1 mol/kg). The residence time of the gas in the molten mixture was on the order of 1 second.

The peak of the $SiH_4$ formed was determined by infrared analysis, at 2,100 $cm^{-1}$, of the gaseous mixture exiting the reactor, as a function of the temperature of the bath of molten salts.

The results are plotted as curve 1 of the FIGURE of Drawing. It will be seen that the cracking of $SiH_4$ only occurs at about 480° C. and that, up to this temperature, the yield of silane is virtually equal to 100%.

EXAMPLE 2

The eutectic mixture $BaCl_2/KCl/LiCl$ (6/40/54 mol %) melting at 320° C. was employed. The operating conditions and conditions of analysis were the same as in the previous example. The results are plotted as curve 2 of the FIGURE of Drawing. It will be seen that the cracking of $SiH_4$ only occurs at about 500° C. and that, up to this temperature, the yield of silane is virtually equal to 100%.

COMPARATIVE EXAMPLE

A eutectic binary mixture LiCl/KCl (58.8/41.2 mol %) was employed under the same conditions as in the previous examples. The results are plotted as curve 3 of the FIGURE of Drawing. It will be seen that, above 400° C., the yield of $SiH_4$ is considerably less than 100%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of $SiH_4$ which comprises hydrogenating a chlorosilane in a bath of molten salts, said molten bath being a ternary mixture of lithium chloride/potassium chloride/calcium chloride or lithium chloride/potassium chloride/barium chloride, with said ternary mixture having a melting point not in excess of about 400° C., and said $SiH_4$ being stable in the molten bath at a higher temperature than that at which $SiH_4$, prepared by the hydrogenation of a chlorosilane in a molten LiCl/KCl eutectic mixture, is stable in said molten LiCl/KCl eutectic mixture.

2. The process as defined by claim 1, said molten bath being a ternary mixture of $LiCl/KCl/BaCl_2$.

3. The process as defined by claim 1, said molten bath being a ternary mixture of $LiCl/KCl/CaCl_2$.

4. The process as defined by claim 1, wherein said ternary mixture is a eutectic ternary mixture.

* * * * *